Nov. 8, 1960  R. H. JORDAN  2,959,183
SINGLE LEVER CONTROL VALVE
Filed Jan. 14, 1958  2 Sheets-Sheet 2

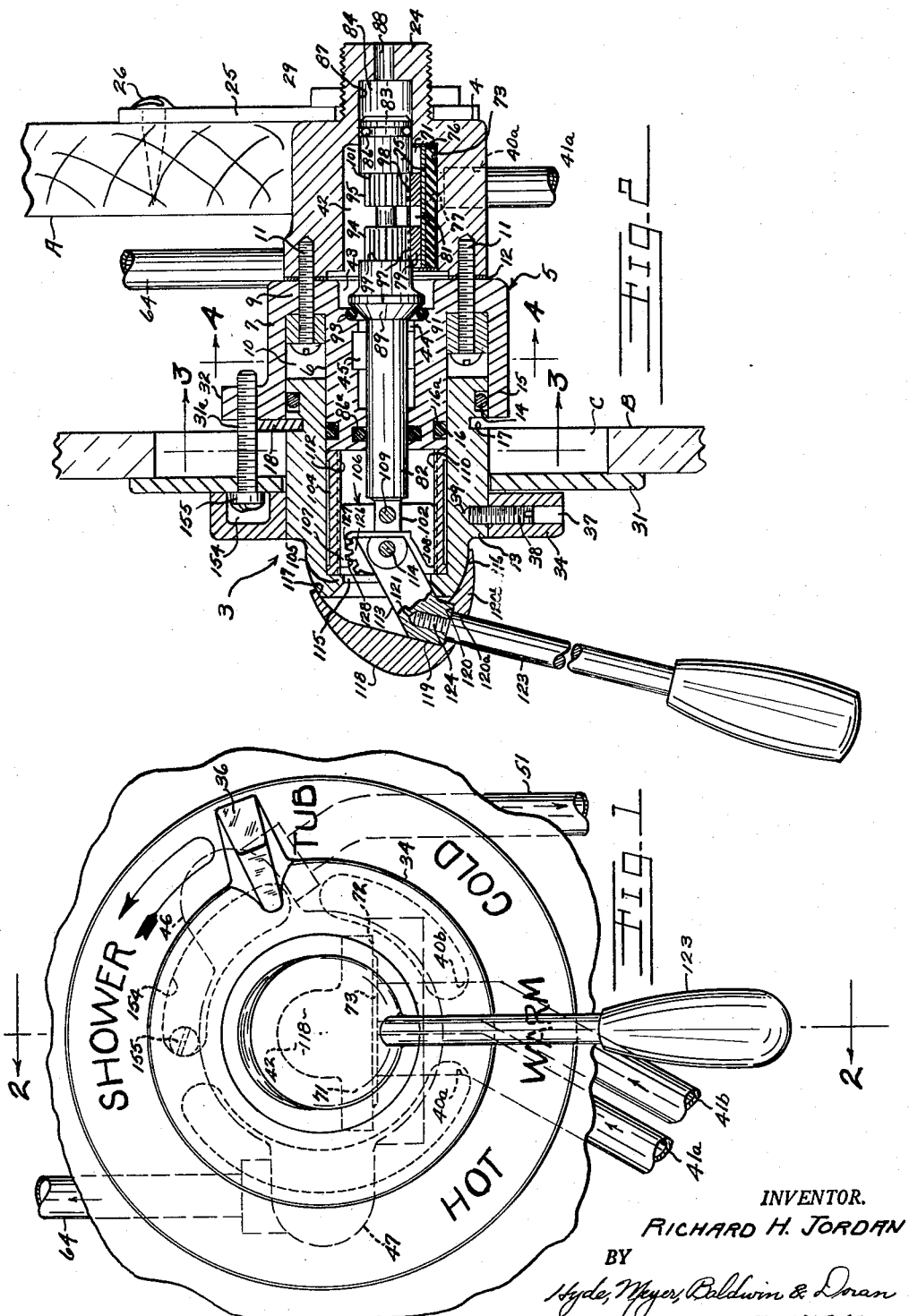

INVENTOR.
RICHARD H. JORDAN
BY
Hyde, Meyer, Baldwin & Doran
ATTORNEYS

# United States Patent Office 2,959,183
Patented Nov. 8, 1960

2,959,183

SINGLE LEVER CONTROL VALVE

Richard H. Jordan, Mansfield, Ohio, assignor to Barnes Manufacturing Co., Mansfield, Ohio, a corporation of Ohio Filed Jan. 14, 1958, Ser. No. 708,849

6 Claims. (Cl. 137—119)

This invention relates to fluid controls and more particularly to improvements in fluid control valves especially designed to selectively provide an output flow of one fluid or of a mixture of fluids into predetermined outlet ports of the same.

A primary object of the present invention is the provision of novel and improved fluid control means especially designed for use with a fluid control valve which provides an output flow of one fluid or of a mixture of a plurality of fluids and wherein said control means is selectively actuatable to divert the output flow to any one of a plurality of outlet ports of said valve.

Another object of the present invention is the provision of novel and improved fluid control means for use with a fluid control valve which provides an output flow of one fluid or of a mixture of a plurality of fluids and wherein said control means is selectively normally positioned to provide an output flow to one of a pair of valve outlet ports and adjustably conditioned to an actuated position to provide an output flow to the other of said pair of outlet ports.

Still another object of the present invention is the provision of novel and improved fluid control means for use with a fluid control valve which provides an output flow of one fluid or of a mixture of several fluids, and wherein said control means is selectively normally positioned to provide an output flow to one of a pair of valve outlet ports and adjustably conditioned to an actuated position to provide an output flow to the other of said pair of outlet ports; and further responsive in said actuated position upon a cessation of said output flow to be automatically conditioned to effect a subsequent output fluid flow to said one valve outlet port.

Another object of the present invention is the provision of a novel and improved fluid control valve especially designed to provide an output flow of one fluid or of a mixture of several fluids and including fluid control means effective to provide an output flow to one of a pair of outlet ports and adjustably conditioned to an actuated position to provide an output flow to the other of said outlet ports.

Additional objects and advantages of the present invention will be realized by those skilled in the art to which it pertains upon reference to the following description of a preferred embodiment thereof and also to the accompanying drawings forming a part of this specification and wherein:

Fig. 1 is a plan view of a single lever actuated control valve embodying the present invention:

Fig. 2 is a longitudinal sectional view of the control valve taken substantially on line 2—2 of Fig. 1 and shows the same in its normally closed position;

Figure 3:
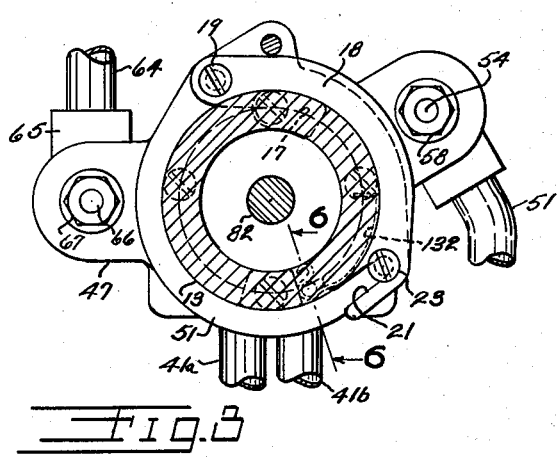
Fig. 3 is a sectional view taken substantially on line 3—3 of Fig. 2.

Briefly, the novel and improved fluid control means of the present invention is herein embodied in a control valve connected in fluid circuit with two separate fluid sources, for instance, hot and cold water, and which is operative to provide an output flow of one or both of said fluids of a predetermined amount and temperature; said control means being selectively actuatable to divert said output flow to any one of the outlet ports of said valve. The instant form of fluid control means is also operative in response to the output flow being discontinued to condition the control valve such that a predetermined one of the outlet ports of the same is normally in fluid circuit with said fluid sources and hence operative upon a subsequent actuation of the valve to provide an output flow to said one outlet port.

Referring now to the drawings wherein like elements are designated by the same reference character, the novel and improved fluid control means of the present invention is herein embodied, merely for purposes of disclosure, in a single lever actuated control valve somewhat similar in construction to the valve disclosed in my copending application Serial No. 572,563, filed on March 19, 1956, and now abandoned.

The instant form of valve is, however, especially designed for use in a domestic shower and tub installation wherein it is desirable to selectively provide a controlled supply of water at a preselected temperature to either the shower or tub appliances of the bath installation. It is also to be understood that the fluid control means of the present invention is also applicable for use with other forms of control valves wherein it is desired to selectively control the fluid flow therethrough, and the following disclosure of a preferred use and operation thereof is not intended to define limitations as to the inventive concepts of the same.

More particularly the disclosed embodiment of control valve includes a valve body 3 in which the several components of the valve proper are mounted and comprising a valve housing 4 and an elongated bushing member 5, the latter having an inner cylindrical casing 6 and an outer shell 7 spaced radially outwardly from the casing and integrally connected thereto at its one end by an annular transverse end wall 9, defining therebetween an annular chamber 10; the latter also being hereinafter referred to as a fluid diversion chamber. The housing 4 and bushing member 5 are rigidly attached to each other in substantial axial prolongation by means of screws 11 received in the end wall 9 of said bushing member, extending therethrough and into threaded engagement with the adjacent end of the housing 4. A suitable gasket 12 interposed between the adjoining end surfaces of said housing and bushing member provides a fluid leak-proof seal therebetween. Said valve body also includes a cylindrical sleeve member 13 which has its one end disposed within the open end of the chamber 10, said sleeve member having slight clearance in diametrical dimensions in said chamber so as to be freely rotatable therein. A suitable O ring 14 disposed within an annular groove 15 formed on the outside surface of the sleeve member 13 engages the inner surface of the outer shell 7 adjacent the open end of said chamber to prevent a transgression of fluid between said sleeve and bushing members. In like manner, a suitable O ring 16, disposed in an annular groove 16a provided on the end of the casing 6 of the bushing member engages with the inner wall of the sleeve member 13 to thereby prevent fluid from transgressing therepast.

The sleeve member 13 is keyed to the bushing member 5, and for this purpose an annular recess 17 is formed in said sleeve member adjacent the aforesaid groove 15, and receives a semi-circular lock member 18, the latter being more clearly shown in Fig. 3, and having its one end pivotally attached by means of screw 19 to the adjoining face of the bushing 4 and its opposite end formed with an elongated slot 21 into which is received the shank of the screw 23, the latter being threadably received in said bushing face in circumferential spaced relation to the screw 19. The inner semi-circular edge of the lock member 18 extends into the annular recess 17 and in this manner locks the sleeve member to said bushing, thus preventing a longitudinal separation of the same while permitting the sleeve member to be freely rotatable in said bushing.

The valve body 3 is adapted to be attached to the structural members of a domestic bath installation such as the studding member at A and wall B in Fig. 2 of a conventional bath enclosure, and for this purpose the inner end of the valve housing 4 is integrally provided with an externally threaded stem 24 projecting longitudinally outwardly of said housing and mounting a bracket 25, the latter extending substantially perpendicularly of the valve body to lie against one side of the studding member A. A suitable fastener such as wood screw 26 is extended through an aperture in said bracket and is adapted to be threadably disposed within the studding member to secure the valve body to the latter. Said stem portion also threadably receives a nut 29 or the like which is adapted to bind the latter to said bracket. In this manner, the valve body 3 is suspended from the studding member A and extends substantially horizontally forwardly thereof and into and through a service hole C in the wall B of the bath enclosure. An escutcheon plate 31 may be placed over the forward end of the sleeve member 13 of the valve body 3 and against the outer surface of the wall B substantially covering the service hole C, and an elongated screw 31a carried by said plate and extending through the latter and into threaded engagement with a lug 32 formed integrally on the adjacent end of the bushing 5 is effective to retain said valve body in its central position within said service hole. In addition, the escutcheon plate may be provided with suitable visual indicia on its outer face as is more clearly shown in Fig. 1 and which denotes the selective positions to which the valve proper may be moved to provide a supply of fluid to either the shower or tub appliances and also the placement of the valve for a preselected combination or mixture of hot and cold water or merely a supply of either of said fluids as will be later explained.

A flat ring member 34 mounted on the free end of the sleeve member 13 adjacent to and forwardly of the escutcheon plate 31, is integrally provided with a projection or pointer 36 extending over the latter so as to readily indicate to the user the operative position to which the valve proper has been moved. The ring member 34, in addition, is provided with a radially extending threaded hole 37 which threadably receives a set screw 38, the latter projecting radially inwardly into a suitable threaded aperture 39 formed in the sleeve member 13, being effective to couple said members together. The aperture 39 is located in said sleeve member such that with the valve proper, presently to be described, assembled within the valve body the ring member 34 may be attached to said sleeve member such that its pointer 36 correctly indicates on the escutcheon plate 31 the position presently occupied by said valve proper.

In the disclosure of the internal structure of the control valve now to follow, reference will be made to the location of several parts thereof as being in the forward or rearward portion of the valve body, and will refer respectively, to those portions adjacent to the wall B or studding member A of the bath enclosure.

Figure 4:
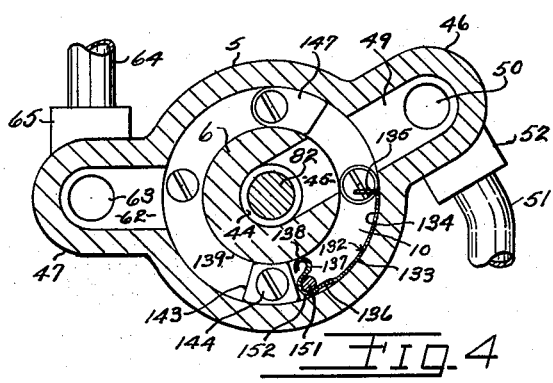
Fig. 4 is a sectional view taken substantially on line 4—4 of Fig. 2 and shows the fluid control means in one position to effect an output fluid flow to one of the valve outlet ports.

As previously mentioned, the instant form of control valve is adapted to be inserted into the fluid circuit of two separate sources of fluid such as hot and cold water, and to accomplish this, the valve housing 4 of said body is provided with a pair of inlet ports 40a and 40b, Fig. 1, which are circumferentially spaced about said valve housing and receive conduits 41a and 41b, the latter in turn being connected to a source of hot and a source of cold water, respectively. The inner end of the inlet ports 40a and 40b communicate with a fluid mixing chamber 42, Fig. 2, formed centrally within the valve housing 4, said chamber connecting at its forward end to an enlarged shallow bore 43 formed in the adjacent end of the bushing 5. Said shallow bore, in turn, opens at its opposite end to a channel 44 formed centrally in the bushing casing 6 and having a passageway 45 provided at its medial portion extending transversely outwardly thereof and communicating with the aforementioned annular chamber 10, as is shown in Fig. 4.

Figure 8:
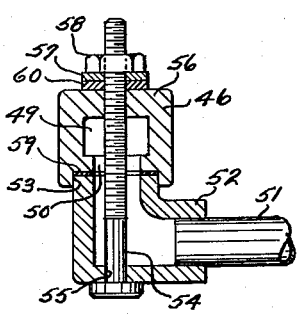
Fig. 8 is a sectional view taken substantially on line 8—8 of Fig. 5 and shows a solderless type of connection for attaching the appliance conduits to the control valve body.

The valve body 3 is also adapted to be directly connected to the shower and tub appliances of the bath installation and for this purpose, the bushing 5 is integrally provided with a pair of circumferentially spaced bosses 46 and 47, projecting radially outwardly from the axis thereof. The boss 46 is shown to be centrally internally provided with an outlet chamber 49, extending longitudinally therethrough and radially toward the axis of the valve body 3 wherein it communicates with the annular chamber 10. Said boss, in addition, is provided with an outlet port 50 adjacent its outer end which communicates with the outlet chamber 49 and thence extends transversely therefrom through said boss to atmosphere. A suitable length of conduit as is indicated at 51, and which has its remote end (not shown) connected in fluid circuit with the tub appliance of the bath installation is connected at its opposite end to the boss 46. To accomplish this, a suitable elbow-type fitting 52 has its one end disposed within a circular recess 53, Fig. 8, formed within the rearward end of the boss 46 and communicating with the outlet port 50. The conduit 51 is attached to the opposite end of said elbow by any suitable means such as brazing, soldering or the like. An elongated fastener, such as bolt 54, is then inserted into an aperture 55 formed in the fitting wall and extends through said fitting, port 50 and adjoining end of the boss chamber 49 in radially inwardly spaced relation so as to enable a transgression of fluid therethrough, and thence through the forward wall 56 of said boss wherein the protruding end threadably receives a suitable lock washer 57 and lock nut 58, or the like. In addition, sealing washers 59 and 60 may be disposed within the recess 53, between the base of the latter and said elbow fitting, and between the adjoining surfaces of the lock washer 58 and boss wall 56, respectively, so as to prevent a leakage of fluid between said members. In this manner, a solderless, fluid leakproof connection is provided between the elbow 52 and boss 46, which connection may be readily disassembled for maintenance or the like, since it is accessible through the service hole C in the bath enclosure wall B.

The boss 47 is also internally provided with an outlet chamber 62 communicating on its inner end with the chamber 10 and at its opposite end with a port 63, the latter, in turn, extending transversely through said boss and communicating with atmosphere. A suitable length of conduit 64, having its remote end (not shown) connected in fluid circuit with the shower appliance of the bath installation, has its opposite end connected in fluid circuit with the boss outlet chamber 62 by means of an elbow fitting 65 being attached to the boss 47 in a solderless, fluid leak-proof connection, identical to that for attaching the aforementioned tub conduit 51, and rigidly secured to said boss by means of bolt 66 and nut 67.

With the above described structure, it is now realized that the instant form of control valve is connected in series fluid circuit between the sources of hot and cold water and the shower and tub appliances, and is further operative through valve means now to be described to selectively provide a controlled flow of one and/or both of said fluids to either of the latter.

The fluid mixing chamber 42 in the valve housing 4, as is shown in Fig. 2, is formed with a valve cavity 71 substantially rectangular in transverse cross sectional configuration and communicating centrally with said chamber on its one longitudinally extending longer wall, adjacent to the axis of said housing. The oppositely disposed longer wall of said cavity is centrally provided with a shallow recess 73, which communicates with the aforementioned hot and cold water supply conduits 41a and 41b, respectively.

Valve control means, similar to that disclosed in the aforementioned copending application, are disposed within said valve cavity and control the flow of either and/or both of said fluids into the fluid mixing chamber 42, and in its present form includes a stationary plate 75 substantially equal in size to that of the valve cavity 71, and which is placed against the cavity wall 72 extending completely across the recess 73. A seal 76 formed of a suitable resilient rubber-like material is securely fastened to the face of the stationary plate 75 opening to the recess 73, and said plate and seal are in addition, provided with a pair of orifices 77 (only one of which is shown in Fig. 2), each of which is in substantial alignment and communicates with one of the inlet ports 40a or 40b. The seal 76 is also integrally provided with suitable bead members (not shown) which engage the base of the recess 73 and effect a fluid leak-proof seal between and around the inlet ports 40a and 40b.

The valve control means also includes a reciprocable control plate 79 having a flat side which is placed in sealing engagement against the opposite face of the stationary plate 75. As seen in Fig. 2, the length of the control plate 79 in a direction taken longitudinally of the valve body 3 is somewhat less than the length of the stationary plate 75, the reason for which will be presently explained. It is also intended that the width of said control plate (not shown), referring to the dimension thereof taken transversely of said valve body, is somewhat less than the transverse width of said stationary plate. It is also contemplated that the resilient characteristics of the seal 76 will be effective to retain the control plate and stationary plate under a suitable pressure and hence function to compensate for any wear between the same whereby a more satisfactory seal therebetween may be obtained over a longer period of time than would otherwise be possible by utilizing a valve plate of rigid construction.

The control plate 79 is centrally provided with an orifice 81 which has a length (not shown) taken transversely of the valve body 3 that is greater than the transverse distance between the aligned ports 40a and 40b and associated orifices 77 in the stationary plate 75. Hence, with this particular structure, it will be readily seen that when the control plate 79 is moved longitudinally of the valve housing 4 to a predetermined actuated position, later to be described for volume control and then slidably moved in a transverse direction, as above defined for temperature control to bring the orifice 81 into selective registration with the ports 40a and 40b and their associated orifices 77, a preselected proportion of hot and/or cold water may flow into the mixing chamber 42.

To provide for this slidable longitudinal and transverse movement to the control plate 79, an elongated valve stem 82 is disposed in the valve body 3 extending longitudinally therethrough and in radially inwardly spaced relation centrally through the channel 44, passageway 45 and shallow bore 43 of the bushing casing 6, and into and through the fluid mixing chamber 42 of the valve housing 4. The inner end 83 of the valve stem 82 extends into a bore 84 formed centrally in the stem portion 24 of the valve housing 4, opening to the mixing chamber 42, and a suitable O-ring 86 mounted on said inner end engages with the annular wall 87 of said bore to prevent a transgression of fluid therebetween. A suitable O-ring 86a carried within the forward end of the bushing casing 6 also engages with the surface of the valve stem 82 to prevent a leakage of fluid forwardly therebetween. Said housing stem portion 24 is also provided with an orifice 88 communicating on its one end with the bore 84 and on its opposite end to the exterior of said valve housing to thereby prevent the formation of a vacuum lock, as referred to in the art, which would cause the valve to become inoperative.

The valve stem 82 is integrally formed at its medial portion with a valve head 89, substantially conical-shaped in configuration and diverging radially outwardly from said portion and into the bore 43. An annular groove 91, substantially semicircular in cross-sectional configuration, is formed at the adjoining ends of the chamber 44 and bore 43 in the bushing casing 6 into which is partially disposed a torus-shaped valve member 93 formed of a suitable resilient material such as soft rubber. Said valve member projects radially inwardly toward the valve stem 82 and defines a valve seat for the aforementioned valve head 89, the latter of which is adapted to firmly engage said valve seat whenever the valve stem 82 is in its forward position relative to the valve housing 4, or to the left as viewed in Fig. 2, thereby being effective to seal the mixing chamber 42 from the chamber 44 and connected fluid passageway 45.

A pair of pinions 94 and 95 is suitably mounted on the valve stem 82 intermediate the valve head 89 and the aforesaid rearward end 83 of said stem being preferably axially spaced therealong a distance substantially equal to the width of the orifice 81 in the control plate 79 taken longitudinally of the valve housing 4 as is shown in Fig. 2. The control plate 79, in turn, is provided with a pair of gear racks 97 and 98 bordering said orifice, and which, although not shown, extend longitudinally therealong transversely of the housing 4 substantially the complete length of said plate. The pinions 94 and 95 mesh with the gear racks 97 and 98, respectively and effect a transverse movement to the control plate in response to a rotational actuation of the valve stem 82. Said valve stem is also integrally provided with enlarged cylindrical shoulder portions 99 and 101 located adjacent the pinions 94 and 95 respectively, and which extend over and embrace the opposed transverse edges of the control plate 79 to effect a longitudinal sliding movement to the latter in response to a similarly directed actuation of said valve stem.

To provide for the actuation of the valve stem 82 as above defined, the same is formed with a reduced shank portion 102 on its forward end which extends centrally through a cylindrical bushing 104, the latter being disposed in the sleeve member 13 and interspaced between the forward end of the casing 6 of the bushing member 5 and a radially inwardly extending annular rim 105, provided on the forward end of said sleeve member. A guide lift member 106, substantially C-shaped in configuration and having depending arms 107 and 108, is rigidly fastened to said shank portion by means of pin 109. The inner wall 110 of the cylindrical bushing 104 is additionally provided with diametrically opposed parallel grooves 112 extending longitudinally therealong and which slidably accommodate the arms 107 and 108 of said guide member. A rocker arm 113, has its inner end extending between the aforesaid depending arms of the guide member 106 and pivotally attached to the cylindrical bushing 104 by means of a suitable pin 114, said pivotal connection being in alignment with the axis of said valve stem. Said rocker arm thence extends from this pivotal connection eccentrically forwardly of the valve stem 82 and outwardly through an enlarged opening 115 centrally provided on the adjacent end of the bushing member 5. The outer surface 116 of said bushing member, at its forward end, is curved inwardly toward the axis of the valve body and is adapted to slidably interfit the curved inner surface 117 of a hollow cap member 118, the latter being somewhat oval-shaped in sectional configuration and placed over and enclosing said forward end of the bushing member 5. The rocker arm 113 is also provided with an offset end portion 119, which is adapted to interfit within a recess 120 formed within the cap member 118, the latter having an opening 120a formed in its wall 120b communicating with said recess. The latter end portion of the rocker arm is also provided with a threaded dead-end hole 121 which communicates centrally with the opening 120a. A valve operating lever 123, having an externally threaded stem 124 of reduced diameter on its one end is mounted in the cap member 118 in such manner that said threaded stem is received within the dead end hole 121 of said rocker arm. In this manner said lever is rigidly attached to the latter and in addition said cap member is retained in its operative position on the bushing member 5, being effective to prevent any foreign material from entering into the valve body 3, and also affords a more positive support for said operating lever than would otherwise be possible if the same was merely attached to the rocker arm 108. The cap member is also operative to form a protective covering for said end of the bushing member in all working positions of the operating lever 123 as will be hereinafter apparent.

The rocker arm 113 is, in addition, integrally formed with a laterally extending flat shoulder 126 adjacent its inner end, having a plurality of external teeth 127 arranged in circumferential spaced relation and which mesh with similarly shaped internal teeth 128 formed on the guide member arm 107.

With this construction, it will now be apparent that a swingable actuation of the operating lever 123, in a plane parallel to the escutcheon plate 31 as viewed in Fig. 1, will effect a rotational movement to the valve stem 82 by means of the interconnected rocker arm 113, cylindrical bushing 104 and guide lift member 106, and hence will result in slidably moving the control plate 79 transversely of the valve body 3 by means of the intermeshing pinions 94 and 95 and gear racks 97 and 98, respectively, for temperature control. And, since the arms 107 and 108 of said guide lift member are disposed in the diametrically opposed grooves 112 of said cylindrical bushing, the meshing relationship between the external teeth 127 on the rocker arm 113 and the internal teeth 128 on said guide lift member is maintained. It is likewise apparent that with a pivotal actuation of the operating lever in an upward direction, as viewed in Fig. 2, perpendicular to said escutcheon plate, the rocker arm 113 is also pivoted clockwise about pin 114 such that the valve stem 82 is slidably moved longitudinally into the valve body 3 carrying the valve head 89 off its seat 93 while at the same time slidably moving the valve control plate 79 also longitudinally of said valve body by means of the opposed shoulder portions 99 and 101 for volume control.

It is further realized that with a longitudinal movement of the valve stem 82 in the manner just described, the control plate 79 is moved in such manner as to position its orifice 81 into selective registry with the inlet ports 40a and 40b and associated inlet orifices 77, whereby a predetermined quantity of hot and/or cold water is permitted to enter the valve mixing chamber 42 and hence transgress through the channel 44 and chamber 45 to the selected valve outlet in a manner to be presently described. It is likewise apparent that with the valve control plate 79 in this latter position, the valve stem 82 may be rotated to slidably move said control plate transversely of the valve housing such that the proportion of either and/or both of said hot and cold water sources entering into said mixing chamber may be varied and hence provide a fluid flow of a preselected temperature.

Summarizing the above operation of the control valve described thus far, it is seen that the rate of the total fluid flow through the valve is controlled by a longitudinal movement of the valve stem 82 which changes the effective area of the inlet ports 40a and 40b in registry with the control plate orifice 81. In like manner, the proportional amount of each fluid entering into the mixing chamber and hence the temperature of the fluid flow is regulated by a rotational movement of the valve stem which is effective to change the position of registry of said plate orifice 81 relative to either and/or both of said inlet ports.

The novel fluid flow control means for the instant form of control valve now to be described is operative to selectively divert the flow of fluid therethrough to either one of the outlet ports 50 and 63 connected in fluid circuit with the tub and shower appliances, respectively. To accomplish this, said control means includes a resilient fluid diverter valve member, indicated by the reference 132 in Figs. 4–6 inclusive, which is slidably disposed in the annular valve chamber 10, and selectively actuatable by the aforementioned ring member 34 to seal the outlet chamber 49 from said annular valve chamber and divert the fluid passing through the latter substantially in an opposite direction relative to the normal flow thereof to the outlet chamber 62 in the boss 47 and hence to the connected port 63 and shower appliance. And, as will be hereinafter apparent, when the use of the shower appliance is no longer desired, and the source of hot and/or cold water to the control valve is shut off, the fluid diverter valve member 132 automatically returns to a position effective to cause said fluid source to flow in its normally directed path to the tub appliance upon a subsequent operation of the control valve, thereby preventing the user from being subjected to an unexpected and oftentimes dangerous fluid flow from said shower appliance in the event the ring member 34 has not been returned to the "tub" position.

Figure 6:
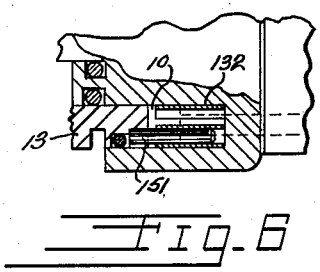
Fig. 6 is a fragmentary sectional view taken substantially on line 6—6 of Fig. 3.
Figure 7:
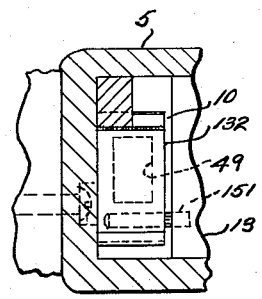
Fig. 7 is a fragmentary sectional view taken substantially on line 7—7 of Fig. 5.
Figure 5:
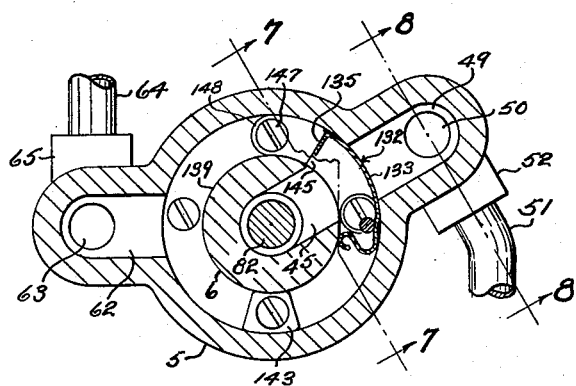
Fig. 5 is a sectional view similar to Fig. 4 but shows the fluid control means in still another position to divert the output fluid flow to another of the valve outlet ports.

More specifically, the fluid diverter valve member 132 in the instant form of control means is substantially rectangular in section and somewhat C shaped in longitudinal configuration, being formed of a suitable metallic material having predetermined resilient characteristics, the purpose for which will be hereinafter apparent. The elongated base portion of said valve member, as indicated at 133 in Fig. 4, has a longitudinal curvature substantially identical to the periphery of the outer wall 134 of the annular fluid diversion chamber 10. An arm 135 is integrally provided at one end of the base portion 133, extending radially inwardly therefrom toward the axis of the valve stem 82 and terminating in approximately the center of the fluid diversion chamber 10. The opposite end of said base portion is formed with an inwardly curved abutment 136, which in turn connects to a substantially reversely curved S-shaped arm 137. As seen in Figs. 4 and 5, said latter arm extends radially inwardly across the chamber 10 wherein its curved end 138 slidably engages with the outer wall 139 of the bushing member casing 6. And, as is seen in Figs. 6 and 7, the width of the diverter valve member 132 is approximately equal to the depth of the fluid diversion chamber 10 and substantially greater than the size of the outlet chamber 49 communicating with said fluid diversion chamber and tub appliance conduit 51.

Referring now particularly to Fig. 4, the diverter valve member 132 is shown in one operative position within the fluid diversion chamber 10 such that the outlet chamber 49 in the boss 46 communicates with the latter. And, as is also noted, the passageway 45 is purposely formed in the bushing member casing 6 such that it opens into the chamber 10 substantially directly opposite said outlet chamber. Therefore, with this particular construction, and additionally with the said diverter valve member thus located, substantially all of the fluid flowing through the passageway 45 upon an actuation of the valve stem 82 will flow across the fluid diversion chamber 10 and out through the outlet chamber 49 to the connected tub conduit 51. The portion of the fluid, if any, that may tend to flow through the chamber 10 and into the oppositely disposed outlet chamber 62 in the boss 47 in an attempt to flow into the conduit 64 connected to the latter and also to the shower appliance normally located vertically thereabove, will have an insufficient pressure head capable of carrying the fluid upwardly through said conduit 64. As a result therefore, with the location of the diverter valve member 132 in the position as indicated in Fig. 4, the fluid flow through the above described valve proper will be normally directed to the tub appliance; hence this position may be defined as the "tub position" for said valve member.

A stop plug 143 is disposed within the bottom side of the fluid diversion chamber 10, being secured therein by a suitable fastener, such as indicated by the screw at 144, and is located to engage with the arm 137 of the diverter valve member 132 when the latter is in said "tub position."

Referring now to Fig. 5, the diverter valve member 132 is located such that the base 133 thereof lies across the opening of the outlet chamber 49 to seal the latter from the annular chamber 10. And, with said valve member thus located, the fluid flow through the valve proper impinges upon said base and is diverted thereby through the opening designated by the reference 145, between the end of the arm 135 of the latter and the outer wall 139 of the bushing member casing 6, and then flows through the diversion chamber 10 to the outlet chamber 62 and the connected shower conduit 64 to said shower appliance. It is also contemplated that for any rate of fluid flow through the valve proper, a component of force is created thereby as the same impinges upon the base of the valve member 132 which is effective to retain the latter in this position, which may be hereinafter defined as the "shower position." In addition, a stop plug 147 mounted in the upper portion of the chamber 10 by means of a suitable fastener 148 upstream from and adjacent the outlet chamber 49, or in a position between the outlet chambers 49 and 62, engages with the arm 135 of the diverter valve member 132 when the latter is in the aforesaid "shower position." Hence, it is realized that the stop plugs 143 and 147 define the outer limits of movement for the valve member 132 when the same is moved to the "tub" or "shower" position, respectively.

The diverter valve member 132 is adapted to be selectively movable to its "shower position" so as to divert the fluid flow to the shower appliance, and for this purpose the rearward end of the sleeve member 13, as is defined hereinabove, adjacent its peripheral edge, rigidly mounts an elongated cylindrical pin 151 which extends into the diversion chamber 10 and between the opposed arms 135 and 137 of the valve member 132. The sleeve member 13, as is previously described, is also coupled to the ring member 34 by means of the aforesaid set screw 38, hence a rotational movement of the latter also effects a rotational movement to said first named member. Referring now again to Fig. 4, wherein the diverter valve member 132 is located in its "tub position," with a rotational movement of the ring member 34 and connected sleeve member 13 such as to carry the cylindrical pin 151 in a clockwise direction through the annular chamber 10, said pin will engage the arm 137 of said valve member and seat therein, specifically within the outer curved portion 152 of said arm, being retained in this position by a slight retentive force provided by the opposed surfaces of said arm and the adjacent inwardly curved abutment 136. And, with said pin and valve member thus conditioned, the ring member 34 is located such that its projection 36 points to the word "Tub" on the escutcheon plate 31 as is shown in Fig. 1, which visually indicates to the user that the valve member is positioned in the lower part of the fluid diversion chamber 10 and effective to divert the fluid flow to the tub appliance.

To thereafter move the valve member 132 to its "shower" position, the ring member 34 is rotated in a counterclockwise direction as viewed in Fig. 1, thereby rotating the sleeve member 13 in the same direction to move the cylindrical pin 151 and said valve member resiliently connecting with the latter upwardly through the chamber 10 to the aforementioned "shower" position for the same as is shown in Fig. 5. The ring member 34 is, in addition, formed with a groove 154 extending coaxially therearound relative to the valve stem 82 and opening to the escutcheon plate 31. And, as is seen in Fig. 2, the enlarged head 155 of the screw 31a, securing said plate to the bushing member 5, extends into the groove 154 and is adapted to engage with either end of the same, depending upon the direction of rotation given said ring member to thereby define the extreme limits of movement for the latter. For example, as is seen in Fig. 1, the enlarged head 155 of said screw is in engagement with the left-hand terminus of the groove 154 thereby defining the extreme limit for a clockwise rotational actuation for the ring member, which in turn, effects to condition the valve member 132 in its aforesaid "tub" position as is seen in Fig. 4, and also locates the projection 36 on said ring member opposite the word "Tub" on the escutcheon plate 31 as is likewise seen in Fig. 1.

An important feature of the instant form of fluid control means relates to the automatic return of the valve member 132 to its "tub" position after it is no longer desired to use the shower appliance. This return movement is possible to attain by reason of the fact that the control valve is normally mounted between the wall B and studding member A such that the chamber 10 lies in substantially a vertical plane with the boss 47 extending horizontally outwardly therefrom and facing upwardly to receive the shower conduit 64 as is seen in Figs. 1 and 2.

With the control valve thus positioned, then when the ring member 34 is rotated counterclockwise to move the valve member 132 to its "shower" position in the manner above described, and as is seen in Fig. 5, said valve member is raised upwardly into the chamber 10 until the arm 135 of the same strikes the stop plug 147. This will occur just before the enlarged head 155 of the screw 31a engages with the right-hand terminus of the groove 154. Hence, said ring member may be additionally rotated relative to said valve member such that the cylindrical pin 151 is forced out of the curved end portion 152 on the opposite arm 137 of the latter. As a result, the valve member is fixedly floatably held in its raised or aforesaid "shower" position by the aforementioned force produced by the fluid flowing through the fluid diversion chamber 10 and impinging upon the base of said valve member as it is diverted thereby to the outlet chamber 62 and connected shower conduit 64. If, thereafter the fluid flow is stopped, for instance, when use of the shower appliance is no longer desired, the valve member 132 is then free to slide downwardly through the chamber 10 by reason of its inherent weight whereby it automatically returns to its "tub" position with its opposite arm 137 engaging with the stop plug 143. Therefore, if the control valve is subsequently actuated, the fluid output flow will be again directed to its normal path to the outlet chamber 49 in the boss 46 communicating through conduit 51 to the tub appliance. And, if the shower appliance is again desired to be used, the ring member 34 must first be rotated clockwise as viewed in Fig. 1 to seat the cylindrical pin 151 within the curved end portion 152 of the valve member 132 before the latter can be carried by the sleeve member 13 to its "shower" position.

Having thus described in detail the preferred form of fluid control means of the present invention, a typical cycle of operation therefor when the same is used to divert a fluid flow to the shower appliance will now be disclosed.

Assuming that the valve stem 82 is in its non-operating or off position as is viewed in Fig. 1, it is then actuated to provide a predetermined proportional flow of hot and/or cold water into the valve mixing chamber 42 wherein the same combines to provide a fluid mixture of a preselected temperature. Said temperatured fluid mixture then flows forwardly through the mixing chamber and into and through the enlarged bore 43, past the unseated valve head 89 and hence into the channel 44 and connected passageway 45 to the fluid diversion chamber 10. The fluid entering into said chamber flows thereacross and into the outlet chamber 49 and then out through the communicating port 50 and conduit 51 to the tub appliance wherein the flow and temperature of the same may be tested. Assuming that the desired mixture and flow is obtained, the ring member 34 is then rotated clockwise to the aforesaid right-end terminus of the groove 154 to make sure that the cylindrical pin 151 is seated within the arm 137 of the diverter valve member 132 and then said ring member is rotated fully counterclockwise to carry said valve member to its "shower" position. As a result, the outlet chamber 49 is sealed off from the fluid diversion chamber 10, and said fluid mixture is diverted by said valve member to the outlet chamber 62 communicating with the conduit 64 and shower appliance. When the use of said shower appliance is no longer desired, the valve stem 82 is returned to its non-operating or off position to stop the flow of hot and/or cold water into the valve mixing chamber 42. Consequently, with the fluid flow stopped, the valve member 132 slides downwardly through the fluid diversion chamber 10 to its "tub" position wherein the outlet chamber 49 is opened and again communicates with said fluid diversion chamber. And, with this latter movement of the valve member 132, the flow of fluid through the valve body 3 upon a subsequent actuation of the valve stem 82 will be directed thereby to the tub appliance.

Having thus described my invention in detail, it is understood that the same is susceptible to various modifications, arrangements and combinations of parts without departing from the inventive concepts disclosed herein and as defined in the following claims.

What is claimed is:

1. A fluid diverter comprising a housing, a chamber in said housing, a pair of spaced outlet ports communicating with said chamber, fluid inlet means providing a directed flow of fluid into said chamber toward one of said outlet ports, a valve member movably disposed about an axis of said chamber and arranged to control flow through said one outlet port, said valve member being movable into sealing relationship with said one outlet port and being biased by gravity to a position out of the path of said directed flow to said one outlet port when said housing is so disposed that the axis of the housing lies in a horizontal plane and said one outlet is positioned above said plane, actuating means releasably connected to said valve member to position said valve member in sealing relationship with said one outlet port, said valve member when in said sealing relationship causing a diversion of said directed flow to the other of said outlet ports, means on said valve member effective to release the same from said actuating means when said valve member is in said sealing relationship with said one outlet port, and said valve member having a surface in impinging relation to the fluid flowing through said chamber as to receive the force exerted thereby and retain said valve member in said sealing relationship.

2. A fluid diverter comprising a housing, a chamber in said housing, a pair of spaced outlet ports communicating with said chamber, fluid inlet means providing a directed flow of fluid into said chamber toward one of said outlet ports, a valve member slidably carried in said chamber about an axis of said chamber and arranged to control flow through said one outlet port, said valve member being movable to a sealing relationship with said one outlet port and being biased by gravity to a position out of the path of said directed flow to said one outlet port when said housing is so disposed that the axis of the housing lies in a horizontal plane and said one outlet is positioned above said plane, actuating means releasably connected to said valve member including a member movably mounted on said housing having driving means extending into said chamber and into operative engagement with said valve member, said actuating means being actuatable as to effect a slidable movement of said valve member into sealing relationship with said one outlet port to thus provide for a diversion of said directed flow to the other of said outlet ports, means on said valve member operatively engageable with said housing in said sealing relationship being effective to disengage said valve member from said driving means, and said valve member having a surface in impinging relation to said fluid flow in siad chamber being positioned to receive the force exerted thereby and retain said valve member in said sealing relationship.

3. A fluid diverter comprising a housing, a chamber in said housing, a pair of spaced outlet ports communicating with said chamber, fluid inlet means providing a directed flow of fluid into said chamber toward one of said outlet ports, a valve member slidably carried in said chamber about an axis of said chamber and arranged to control flow through said one outlet port, said valve member being movable into sealing relationship with said one outlet port and being biased by gravity to a position out of the path of said directed flow to said one outlet port when said housing is so disposed that the axis of the housing lies in a horizontal plane and said one outlet is positioned above said plane, actuating means including a member movably mounted on said housing and having pin means extending into said chamber being resiliently releasably attached to said valve member, said actuating means being actuatable to effect slidable movement of said valve member into sealing relationship with said one outlet port and provide a diversion of said directed flow to the other of said outlet ports, means on said valve member spaced from said pin means being operatively engageable with said housing in said sealing relationship to release said pin means, said valve member having a surface disposed transversely to the path of said directed flow in said chamber to receive the force exerted thereby and retain said valve member in said sealing relationship, being responsive to a cessation of said directed flow to return to an open position.

4. A fluid diverter comprising a housing, a chamber in said housing, a pair of spaced outlet ports communicating with said chamber, fluid inlet means providing a directed flow of fluid into said chamber toward one of said outlet ports, a valve member slidably mounted in said chamber about an axis of said chamber and arranged to control flow through said one outlet port, said valve member being movable into sealing relationship with said one outlet port and being biased by gravity to a position out of the path of said directed flow to said one outlet port when said housing is so disposed that the axis of the housing lies in a horizontal plane and said one outlet is positioned above said plane, said valve member having dimensions greater than said one outlet port for completely covering and sealing the same, an actuator extending from outside said housing to a point of engagement with said valve member, said actuator having means for attachment to said valve member disengageable in the direction of valve sealing movement by resistance to said valve sealing movement, said attachment means being engageable with said valve member in the direction of valve opening movement by resistance to valve opening movement of said valve member, stop means limiting movement of said valve member to open and sealing positions, respectively, relative to said one outlet port, said valve member when in said sealing relationship effecting a diversion of said directed flow to the other of said outlet ports and having a surface in impinging relation to the fluid flowing through said chamber as to receive the force exerted thereby and retain said valve member in said sealing relationship and upon a cessation of said directed flow to fall by gravity to an open position.

5. Fluid diverter means as defined in claim 4 and wherein the wall of said chamber adjacent said one outlet port is arcuate and concave radially inwardly, and said valve member has a radially outward surface complementary to said arcuate wall and slidable therealong.

6. Fluid diverter means as defined in claim 4 and wherein the attachment means between the actuator and valve member comprises pin means carried by said actuator and extending into the chamber, said valve member having a curved end positioned to resiliently receive said pin means upon movement of said valve member and said actuator to an open position of said valve member, and means on said valve member to effect the disengagement of said pin means from said curved end in response to movement of said valve member into sealing relationship across said one outlet port.

References Cited in the file of this patent
UNITED STATES PATENTS

| | | |
|---|---|---|
| 1,878,097 | Bletcher | Sept. 20, 1932 |
| 1,924,771 | Brown | Aug. 29, 1933 |
| 2,519,158 | Symmons | Aug. 15, 1950 |
| 2,563,955 | Pearse | Aug. 14, 1951 |
| 2,741,258 | Bletcher | Apr. 10, 1956 |
| 2,791,231 | Bletcher | May 7, 1957 |